Aug. 14, 1956
J. W. DUDLEY
2,758,910
REMOVING GASEOUS MATERIALS FROM LIQUID
Filed June 15, 1953
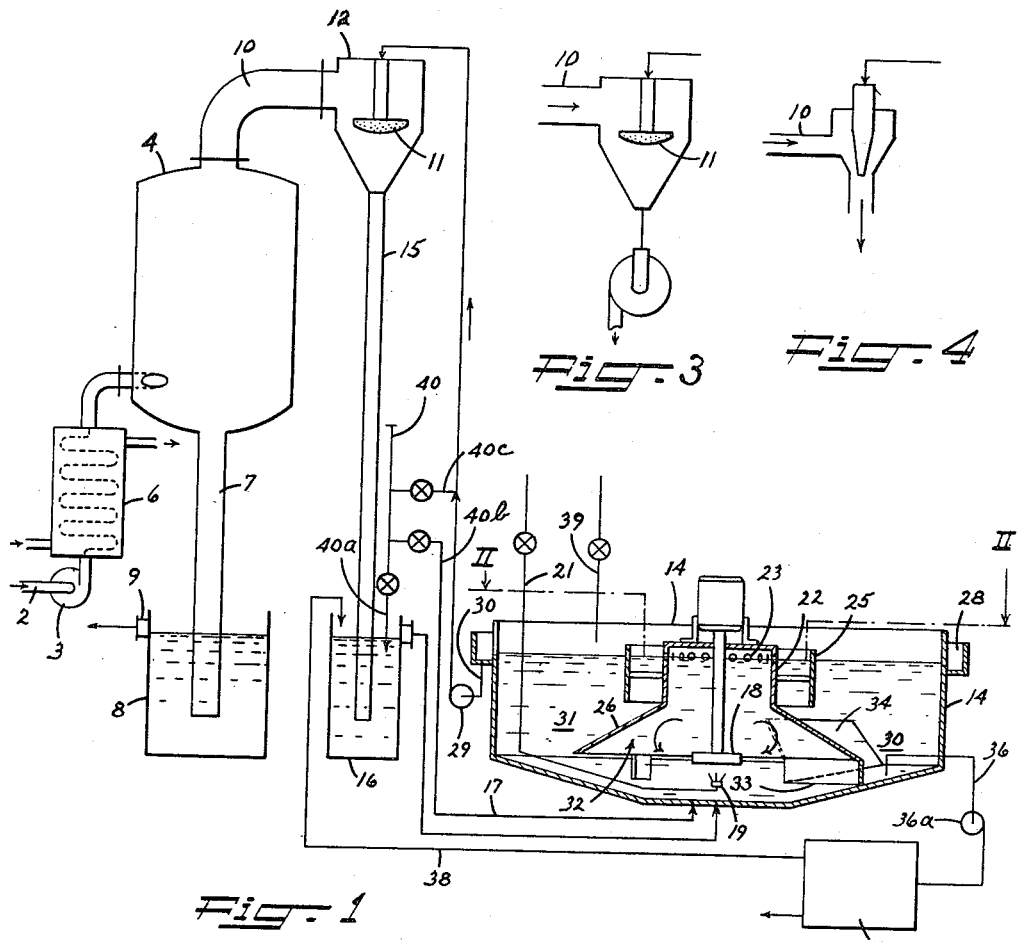
Fig. 3
Fig. 4
Fig. 1
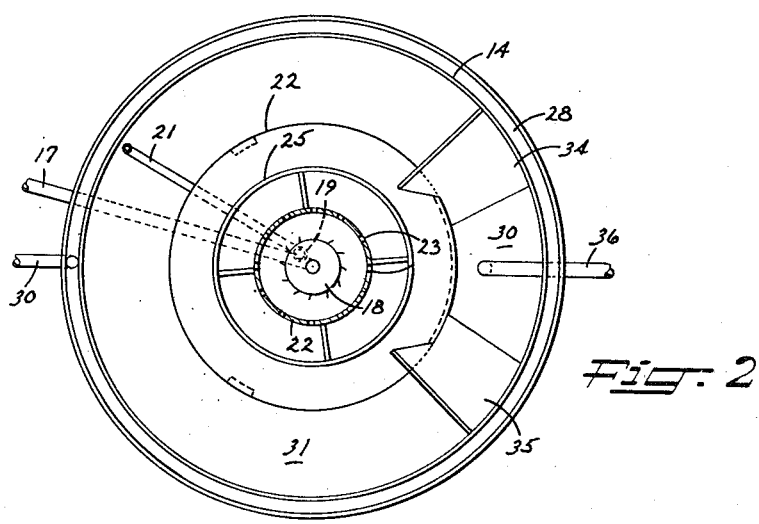
Fig. 2

United States Patent Office 2,758,910
Patented Aug. 14, 1956

2,758,910

REMOVING GASEOUS MATERIALS FROM LIQUID

John W. Dudley, Sharon Hill, Pa., assignor to American Viscose Corporation, Philadelphia, Pa., a corporation of Delaware Application June 15, 1953, Serial No. 361,805

15 Claims. (Cl. 23—1)

The present invention relates to the separation of gases from the liquid-gas mixtures and particularly to recovery facilities wherein the gas removed from a liquid may be converted to a solid or liquid material. For example, in the manufacturing of yarn comprising regenerated cellulose, the liquid coagulant, as a result of coagulating the extruded viscose solution, accumulates such materials as hydrogen sulfide, carbon disulfide, and other sulfur-containing compounds of gaseous or volatile nature. While some of the carbon disulfide carried by the coagulant or spinning bath liquid occurs in the liquid phase, much of it is gas dissolved or dispersed within the bath. Accumulation of such sulfur compounds in the spinning bath may have a detrimental effect on the coagulation reaction. Moreover, such compounds are, in general, malodorous and toxic, and their presence in air or water is readily apparent when they are discharged into the outdoor atmosphere or streams adjacent to a plant for manufacturing regenerated cellulose products. Thus, the used spinning bath solution is ordinarily processed for re-use or for the reclamation of the dissolved solids carried therein. In carrying out such treatments, it is highly desirable that the gases or soluble sulfur compounds be removed from the used bath solutions accompanying the manufacturing of rayon yarn.

It is an object of the present invention to provide a process for removing unwanted gaseous or highly volatile liquid materials that are dissolved in a liquid or admixed therewith, and particularly, separating such unwanted materials from liquid process media to prevent the escape thereof into the atmosphere or to natural waterstreams. A more specific object ancillary to the foregoing object is to convert fluid or dissolved solid sulfur compounds to sulfur or solid sulfur compounds. Another object is to conduct the process with as little consumption of materials, such as water, as possible. A specific object is to provide economical processes for stripping gaseous materials from used spinning bath solution obtained in the manufacturing of regenerated cellulose products by removal therefrom of sulfur compounds to thereby render the solution more suitable for re-use in spinning baths. Other objects, features, and advantages will become apparent from the following description of the invention and the drawing relating thereto in which:

Fig. 1 is a diagrammatic elevation of equipment for carrying out the process of the present invention;

Fig. 2 is a diagrammatic plan view of a portion of the equipment shown in Fig. 1;

Fig. 3 is a diagrammatic view of an alternative type of condenser that may be substituted in the apparatus of Fig. 1; and Fig. 4 is a diagrammatic view of still another type of condenser within the purview of the present invention.

In brief, one or more sulfur compounds in a gaseous or highly volatile liquid state, or other compounds which may occur in either dissolved or admixing relation with a primary liquid may be removed, in accordance with the present invention, from the carrier or primary liquid by subjecting such liquid to suction derived from a condenser through which a second liquid is circulated. The latter liquid mixes with the vapors discharged by the first liquid as the second liquid proceeds through the discharge duct of the condenser. The second liquid passes through the condenser and the seal well, if the condenser is a type which requires a well to maintain vacuum, into the bottom of a treatment container wherein it is immediately mixed with air as it enters the container. The container is baffled so that the mixture of air and liquid travels upwardly to the surface of the liquid in one region and overflows into another region wherein it travels downwardly to a depth that occurs intermediately along the height of the first region. At this depth the liquid and any suspended solid matter heavier than the liquid may separate, the solid matter settling toward the bottom of the chamber and outside the region through which the original mixture passes upwardly, and the clear liquid passing upwardly into another region within the container from which it is returned to the condenser for absorption of more vapors withdrawn from the first liquid. In this manner the second liquid is continuously circulated as a medium for transferring the vaporizable matter of the first liquid into the container wherein such matter may be substantially chemically converted to solids and readily removed therefrom.

The process of the present invention may be carried out by apparatus schematically arranged in accordance with Fig. 1 which depicts a flash chamber 4, the interior of which is maintained at sub-atmospheric pressures, and into which used spinning bath liquid is introduced through a tube 2 at such a rate as to flash off substantially all of the vapors or volatile material carried by the bath liquid. The tube 2 may be connected as shown with a pump 3 for metering the liquid which is to be stripped of vapors to control the feeding thereof into the flash chamber. Such liquid may also be subjected to heating in equipment such as the heat exchanger 6. The heated liquid passes from the exchanger to the flash chamber through the tube 5. The portion of the liquid not vaporized descends through a drainage tube 7 extending downwardly from the chamber 4 into a receiver 8 having an overflow weir or other opening 9 disposed above the lower end of the tube 7 so as to provide a seal for the flash chamber. The degassed spinning bath solution, in passing out of the receiver 8, may be returned, with or without fortification by desired ingredients, to the spinning equipment, and/or to other apparatus not described herein for reclaiming other materials dissolved in the solution.

An essential principle of the present invention is to entrain, mix, absorb, or otherwise collect the vapors withdrawn from the chamber 4 with a stream of liquid which may be thereafter processed to convert such vapors, at least in part, into a solid material. The collecting of the vapors, whether condensable or non-condensable, is expediently accomplished by a direct-contact condenser, i. e., a condenser in which a liquid condensing medium is brought into contact with the vapors to be condensed, because such a condenser may be utilized to produce the partial vacuum required in the chamber 4. Thus, three general types of contact-condensers are illustrated which are satisfactory, namely: (1) the barometric condenser (Fig. 1) which requires a tail pipe or leg of a length in excess of the height of the liquid to be circulated that a vacuum will support (about 32 feet of water under normal conditions); (2) a low-level jet condenser, differing from the barometric type chiefly by having a short leg connected with the suction side of a pump in place of the long leg; and (3) an injector condenser in which the liquid for condensing the vapors passes as a high velocity jet through an orifice thereof. For illustrative purposes, a complete embodiment of the invention is described with the barometric condenser incorporated therein.

Partial vacuum is produced in the chamber 4 through a duct connecting it with the barometric condenser as liquid is discharged from a spray device 11 supported within a housing 12 of the condenser. The liquid collects in a leg or duct 15 thereof and a well or receiver 16 of the condenser functioning as a liquid seal for the leg. The liquid discharged by the device 11 is pumped thereto from a container 14, and in leaving the condenser, carries gases which were flashed from the liquid introduced into the chamber 4. The vapor-laden liquid overflows from the well 16 and passes by gravity, as by line 17, into the bottom of the container 14.

The liquid is discharged upwardly toward an agitator 18 into admixture with a fluid source of oxygen, such as a stream of air discharged from a distributor 19 connected with a supply line 21. When air is the oxidizing medium used, the bubbles of air issuing from the distributor 19 are broken up and finely dispersed within the liquid by the agitator 18 which is designed and driven at such speed as to cause dispersion of the air as very fine bubbles, thus producing much contact of the air with the liquid whereby rapid oxygen absorption by the liquid is obtained. The bubbles rise vertically and tend to lift the liquid upwardly within a circular baffle 22 supported within the container 14.

The baffle 22 is provided with apertures 23 along its upper portion whereby the liquid impelled upwardly by the bubbles overflow through the apertures 23 disposed along a horizontal plane and extending through the baffle 22. The liquid which passes out the top portion of the baffle 22 is confined laterally within a baffle 25 which surrounds the baffle 22. The baffle 25 extends downwardly within the container 14 to a depth occurring intermediately between the top and the bottom of the inner baffle 22 but terminating well above the upper face of the flared portion 26 of the baffle 22 that is disposed vertically under the lower edge of the baffle 25. The liquid discharged from the baffle 22 thus flows downwardly through the region between the spaced concentric baffles and is directed in a radial outward direction by the flared portion 26 of the baffle 22. The fine solid matter that is heavier than the liquid and suspended in the liquid tends to settle within a region below the lower edge of the baffle 25 and radially outside the flared portion of the baffle 22.

In applying the invention in the treatment of used spinning bath as derived from the coagulation of extruded viscose products, the solids produced in the container 14 have, in general, a higher specific gravity value than the liquid in which they are suspended. Thus, clear liquid passes upwardly within the region of the container surrounding the baffle 25 and eventually overflows into a trough 28 which extends around the outer wall of the tank 14. The liquid received by the trough 28 passes therefrom into a pump 29 which returns it to the barometric condenser through the jet 11 thereof.

The solid matter separated from the liquid within the container 14 may be partly or initially formed within the well 16 of the condenser by the introduction thereinto of reagents which react with ingredients of the liquid passing down the leg of the condenser to form suspended solid matter. The well may be constructed to provide rapid movement of the liquid in reaching the overflow point to thus render the well an efficient and convenient mixer into which to add materials for effecting any desired treatment of the condenser liquid.

The solid material suspended within the liquid above the flared baffle portion 26, tends to settle into the lower portion of a quiescent region 31 surrounding the flared portion of the baffle 22. Part of the liquid and suspended matter passes under the lower edge of the baffle 22 and into the region 32 surrounding the agitator 18. However, a pocket 30 is formed between the outer wall of the tank 14 and the baffle 22 by a pair of panels 34 and 35 which extend between the baffle 22 and the outer wall of the container. To complete the pocket, the baffle 22 has a skirt 33 which extends partly along the lower circumference of the baffle between the panels 34 and 35 to the floor of the container. Slurry may be removed from the pocket 30 through a duct or line 36 which extends through the container wall to a filter 37. As shown, the filter and the container 14 are arranged so that the slurry may flow by gravity to the filter but a pump 36a may be included in the line 36 or 38 so that the filter may be force-fed. In the processing of the spinning bath liquid used in the manufacturing of viscose rayon, the solid product of the filter 37 is primarily sulfur. Water or liquid removed from the slurry by the filter may be returned, as indicated, to the vapor extraction system through a connecting line 38 by pressure supplied by the pump 36a into the well 16 of the barometric condenser. Thus, practically all the liquid contained in the system comprising the barometric condenser and the container 14 is recirculated without substantial loss. Only slight replenishment of liquid through a line 39 leading into the container 14 is needed to maintain the liquid at overflow levels in the well 16 and the container 14.

The operation of the apparatus herein described is concerned primarily with the conversion of dissolved and suspended gases carried by the recirculated condenser liquid to a solid product which is primarily sulfur. As such conversion is primarily an oxidation process, various materials may be added to the condenser liquid, preferably introduced into the well 16, to obtain conversion of hydrogen sulfide and carbon disulfide into sulfur or intermediate products which may be acted upon by the air introduced into the container 14 to effect or complete the oxidation thereof. As examples of some materials which may be added to the liquid at some point along the portion of its recirculation path extending from and including the overflow trough 28 of the container 14, through the condenser, and to the bottom region of the container 14 adjacent the air feeder 19 (see feed line 40 and branches 40a, 40b, 40c thereof), are oxides and salts of iron, manganese, and nickel, such as used in the well known "Ferrox" and "Nickel" sulfur recovery processes, and arsenic salts such as sodium thioarsenate used in the "Thylox" process (see Patents Nos. 1,719,180, and 1,719,762). The introduction of such materials into the condenser liquid in combination with the mixing of air with the condenser liquid carrying such materials, results in the production of solids, essentially sulfur which collect in the settling-basin provided in the container 14.

Materials may also be added to the gas-absorbing liquid recirculated through the condenser which aggregate colloidal solid matter to a larger particle size to increase the settling rate, or which function as flocculating agents. Such materials may be introduced in the same manner as described above with respect to the precipitating agents. When flotation is used, however, the clear liquid which is to be drawn from the container 14 and recirculated through the condenser occurs at some level within a quiescent region of the container below the overflow level. Pine oil is one example of a flocculating agent that may be used in an alkaline gas-absorbing medium, such as that forced through the barometric condenser and recirculated as described herein. Oleic acid may be used as a flocculating agent if the recirculated liquid is non-alkaline. However, in this latter case, the arsenic type precipitating agents are preferred because they do not require an alkaline medium.

In the present invention, apparatus of which the various portions thereof have been interrelated and interconnected to carry out a degassing procedure for liquids, especially those which carry gases or highly volatile sulfur compounds, these compounds being converted to solids in the apparatus whereby they may be readily separated from fluid-carrying media and prevented from entering the atmosphere or natural streams. The process is economical since very little loss of power and fluid-carrying medium is incurred. Because of the small loss of liquid in the operation of the process, the loss of those reagents added to the recirculated condenser liquid to promote the formation of solids from the materials obtained by the degassing operation, and/or to accelerate the settling of such solids, is small.

While preferred embodiments of the invention have been shown and described, it is to be understood that changes and variations may be made without departing from the spirit and scope of the invention as defined in the appended claims.

I claim:

1. A method of removing readily vaporizable materials from a liquid comprising the steps of applying suction to a continuous stream of the liquid passing through a region enclosed from the atmosphere to separate said materials from the liquid, producing said suction by circulating a second liquid through another region enclosed from the atmosphere and in communication with the first region, the second liquid collecting and mixing with the vapors discharged by the first liquid as the second liquid proceeds through the second region, mixing with said second liquid at a point along a path of recirculation therefor a material adapted to react with a vapor carried in the second liquid to form a suspended solid material, continuously transferring the second liquid from the second region in a continuous stream into a treatment chamber, allowing solid material suspended in the second liquid having a higher specific gravity than the liquid to settle toward the bottom of the container, pumping relatively clear liquid from the upper portion of a body of the second liquid supported in the container into the second region to maintain suction therein and to collect vaporous material yielded by the first liquid, and removing settled solid material from the bottom of the container.

2. A method of removing readily vaporizable materials from a liquid comprising the steps of applying suction to a continuous stream of the liquid to remove readily separable vapor-forming components thereof, producing said suction by circulating a second liquid through a direct-contact condenser, the second liquid collecting and mixing with the vapors discharged by the first liquid as the second liquid proceeds down the leg of the condenser, continuously transferring the second liquid from the condenser in a continuous stream into a treatment container, continuously feeding an oxygen-supplying fluid into the incoming stream of the second liquid and mixing it therewith to form a fine dispersion of said fluid within the liquid, conducting the resulting fluid-liquid mixture to a relatively quiescent region of the container, allowing solid material suspended in said mixture to settle toward the bottom of the container thereby producing relatively clear liquid in the upper portion of said region, continuously transferring a stream of said relatively clear liquid into the condenser to maintain suction therein and to collect vaporous material yielded by the first liquid, and removing solid material from the bottom of said region.

3. Apparatus for treating a liquid comprising a chamber, means for supplying the liquid to the chamber, means for withdrawing the liquid from the chamber, suction means connected with an upper portion of the chamber comprising a direct-contact condenser having a drainage leg and means for forcing the passage of a liquid condensing medium from the condenser through the leg, a container, means for conducting liquid from said leg to the bottom of the container, means having a discharge port within the bottom of the container adjacent a discharge port for said liquid-conducting means for supplying an oxidizing fluid, means within the container for mixing said fluid and the liquid, said container having a settling region, and means for conducting liquid from the top of said region to, and through, the jet of said condenser.

4. Apparatus for treating a liquid comprising a chamber, means for supplying the liquid to the chamber; means for withdrawing the liquid from the chamber, suction means connected with an upper portion of the chamber comprising a direct-contact condenser having a drainage leg and means for forcing the passage of a liquid condensing medium from the condenser through the leg, a container, means for conducting liquid from said leg to the bottom of the container, means for supplying an oxidizing fluid having a discharge port within the bottom of the container adjacent a discharge port for said liquid-conducting means, means within the container for mixing said fluid and the liquid, said container having a settling region, and means for conducting liquid from the top of said region to, and through, the jet of said condenser.

5. Apparatus for treating a liquid comprising a chamber, means for supplying the liquid to the chamber, means for withdrawing the liquid from the chamber, suction means connected with an upper portion of the chamber comprising a direct-contact condenser having a well for sealing the leg thereof, means for forcing the passage of liquid through said leg from the condenser, said well having an overflow duct, a container having an overflow duct disposed below the overflow duct of the well, means for conducting liquid from the overflow duct of the well to the bottom of the container, air-supply means having a discharge port within the bottom of the container adjacent the discharge port of said liquid-conducting means for introducing air into admixture with liquid coming from said well, means in the container for mixing the air and the liquid within one region, said container having a settling region and baffle means for separating the settling region from said mixing region, the upper part of said mixing region being arranged to discharge liquid into the overflow duct of the container, and means for pumping liquid from the overflow means to, and through, the jet of said condenser.

6. A method of removing readily vaporizable materials from a liquid comprising the steps of applying suction to a continuous stream of the liquid to remove readily separable vapor-forming components thereof, producing said suction by circulating a second liquid through a barometric condenser, the second liquid collecting and mixing with the vapors discharged by the first liquid as the second liquid proceeds down the leg of the condenser, continuously transferring the second liquid from the condenser in a continuous stream into the bottom of a treatment container, continuously feeding air into the bottom of the container into admixture with the incoming second liquid, vigorously agitating the mixture to obtain a homogeneous dispersion of very fine air bubbles within the second liquid, channeling the mixture upwardly through a region to an overflow point therefor within the container and allowing air to escape, then channeling the liquid downwardly through a second region adjacent the first region, the second region extending to an intermediate depth with respect to the vertical length of the first region whereby solid material of the aerated second liquid may settle into a third region and clear liquid may move upwardly into a fourth region outside the second region, continuously transferring the clear liquid from the fourth region into the barometric condenser to maintain suction therein and to collect vaporous material yielded by the first liquid, and removing a slurry of the solid material from the third region.

7. A method as defined in claim 6 wherein the slurry is filtered to separate the liquid from the solid material of the slurry, and then returning said filtered liquid to the stream of the second liquid being recirculated through the container and the condenser.

8. A method of removing readily vaporizable materials from a liquid comprising the steps of applying suction to a continuous stream of the liquid to remove readily separable vapor-forming components thereof, producing said suction by circulating a second liquid through a barometric condenser, the second liquid collecting and mixing with the vapors discharged by the first liquid as the second liquid proceeds down the leg of the condenser, continuously transferring the second liquid from the condenser in a continuous stream into the bottom of a treatment container, introducing air into the bottom of the container into admixture with the incoming liquid, vigorously agitating the mixture to obtain a homogeneous dispersion of fine bubbles within the second liquid, channeling the mixture upwardly through a central region to the surface of the liquid within the container and allowing air to escape, then channeling the liquid downwardly through a second region which surrounds the central region, said outer region extending to an intermediate depth with respect to the top and the bottom of the inner region whereby solid material carried by the aerated second liquid may settle into a third region of the container disposed outside the central region and clear liquid may move upwardly into a fourth region surrounding the second region, continuously pumping the clear liquid from the fourth region into the barometric condenser for the production of suction therein and the extraction therein of vaporous material from the first liquid, and removing a slurry containing said solid material from the third region.

9. A method of removing readily vaporizable materials from a liquid comprising the steps of applying suction to a continuous stream of liquid to remove readily separable vapor-forming components thereof, producing said suction by circulating a second liquid through a barometric condenser, the second liquid collecting and mixing with the vapors discharged by the first liquid as the second liquid proceeds down the leg of the condenser, continuously transferring the second liquid from the condenser in a continuous stream into the bottom of a treatment container, continuously adding a precipitating agent to said stream and introducing air into the bottom of the container into admixture with the incoming second liquid and then vigorously agitating the mixture to obtain a homogeneous dispersion of very fine air bubbles within the second liquid to convert said vaporous materials carried by the second liquid into compounds of solid state, channeling the mixture upwardly through a region to a surface of the liquid within the container and allowing air to escape, then channeling the liquid downwardly through a second region adjacent the first region, the second region extending to an intermediate depth with respect to the vertical length of the first region whereby solid material of the area of the second liquid may settle into a third region and clear liquid may move upwardly into a fourth region outside the second region, pumping the clear liquid from the fourth region into the barometric condenser to produce suction therein and extraction of vaporous material from the first liquid, and removing the slurry from the third region.

10. A method of removing readily vaporizable materials in a liquid comprising the steps of applying suction to a continuous stream of the liquid to remove readily separable vapors from a compartment thereof, producing said suction by circulating a second liquid through a barometric condenser, the second liquid collecting and mixing with the vapors discharged by the first liquid as the second liquid proceeds down the leg of the condenser, continuously transferring the second liquid from the condenser in a continuous stream into the bottom of a treatment container, introducing air into the bottom of the container into admixture with the incoming second liquid, vigorously agitating the mixture to obtain a homogeneous dispersion of very fine air bubbles within the second liquid, channeling the mixture to an overflow point therefor within the container and allowing air to escape, then channeling the liquid downwardly through a second region adjacent the first region, the second region extending to an intermediate depth with respect to the vertical length of the first region whereby solid material of the aerated second liquid may settle into a third region and clear liquid may move upwardly into a fourth region outside the second region, collecting the clear liquid as it overflows from the top of the fourth region and pumping it into the barometric condenser to maintain suction therein and to collect vaporous material yielded by the first liquid, and removing a slurry of the solid material from the third region.

11. A method of removing readily vaporizable materials from a liquid comprising the steps of applying suction to a continuous stream of the liquid to remove readily separable vapor-forming components thereof, producing said suction by circulating a second liquid through a barometric condenser, the second liquid collecting and mixing with the vapors discharged by the first liquid as the second liquid proceeds down the leg of the condenser into a well which constitutes a liquid seal of the condenser, overflowing the liquid from said well and feeding it by gravity into the bottom of a treatment container, continuously feeding air into the bottom of the container into admixture with the incoming second liquid, vigorously agitating the mixture to obtain a homogeneous dispersion of very fine bubbles within the second liquid, channeling the mixture upwardly through a region to an overflow point therefor within the container and allowing air to escape, then channeling the liquid downwardly through a second region adjacent the first region, the second region extending to an intermediate depth with respect to the vertical length of the first region whereby solid material of the aerated second liquid may settle into a third region and clear liquid may move upwardly into a fourth region outside the second region, continuously pumping the clear liquid from the fourth region into the barometric condenser to maintain suction therein and to collect vaporous material yielded by the first liquid, and removing the slurry of the solid material from the third region.

12. A method as defined in claim 11 wherein the slurry is filtered to separate the liquid and the solid material thereof and the filtered liquid is returned to said well.

13. A method as defined in claim 11 wherein the first liquid comprises used acid spin bath solution obtained in the manufacturing of regenerated cellulose products, the method comprising additional steps of continuously adding predetermined amounts of caustic soda and flocculating agents to the liquid discharged from the condenser.

14. A method as defined in claim 13 wherein the caustic soda and flocculating agents are introduced into the well of the condenser.

15. A method of removing readily vaporizable materials from a liquid comprising the steps of applying suction to a continuous stream of the liquid to remove readily separable vapor-forming components thereof, producing said suction by circulating a second liquid through a barometric condenser, the second liquid collecting and mixing with the vapors discharged by the first liquid as the second liquid proceeds down the leg of the condenser, continuously transferring the second liquid from the condenser in a continuous stream into the bottom of a treatment container, continuously feeding air into the bottom of the container into admixture with the incoming second liquid, vigorously agitating the mixture to obtain a homogeneous dispersion of very fine air bubbles within the second liquid, channeling the mixture upwardly through a region to an overflow point therefor within the container and allowing air to escape, then channeling the liquid downwardly through a second region adjacent the first region, the second region extending to an intermediate depth with respect to the vertical length of the first region whereby a solid material of the aerated second liquid may settle into a third region and clear liquid may move upwardly into a fourth region outside the second region, continuously transferring clear liquid from the fourth region into the barometric condenser to maintain suction therein and to collect vaporous material yielded by the first liquid, returning some of the liquid containing solid material from the bottom of the third region into the bottom of the first region, collecting a concentrated slurry of said liquid and solid material in a fifth region disposed within said third region, and withdrawing said slurry from the fifth region.

References Cited in the file of this patent

UNITED STATES PATENTS

| | | |
|---|---|---|
| 957,295 | Alberti | May 10, 1910 |
| 2,091,898 | Weber | Aug. 31, 1937 |
| 2,109,347 | Beekhuis | Feb. 22, 1938 |
| 2,458,261 | Green et al. | Jan. 4, 1949 |
| 2,512,266 | Gaute | June 20, 1950 |